(12) United States Patent
Cheng

(10) Patent No.: US 9,101,098 B2
(45) Date of Patent: Aug. 11, 2015

(54) WATER TIMER

(71) Applicant: YUAN-MEI CORP., Changhua County (TW)

(72) Inventor: Chi-Han Cheng, Changhua County (TW)

(73) Assignee: YUAN-MEI CORP., Changhua County (TW)

( * ) Notice: Subject to any disclaimer, the term of this patent is extended or adjusted under 35 U.S.C. 154(b) by 233 days.

(21) Appl. No.: 13/972,062

(22) Filed: Aug. 21, 2013

(65) Prior Publication Data

US 2015/0053288 A1    Feb. 26, 2015

(51) Int. Cl.
*F16K 31/48* (2006.01)
*A01G 25/16* (2006.01)

(52) U.S. Cl.
CPC ....... *A01G 25/165* (2013.01); *Y10T 137/86389* (2015.04)

(58) Field of Classification Search
USPC .......................... 137/343, 382, 624.11, 552.7
See application file for complete search history.

(56) References Cited

U.S. PATENT DOCUMENTS

| | | | | |
|---|---|---|---|---|
| 4,592,505 A * | 6/1986 | Bruninga et al. | ................ | 239/69 |
| 4,633,905 A * | 1/1987 | Wang | ........................ | 137/624.11 |
| 4,807,664 A * | 2/1989 | Wilson et al. | ............ | 137/624.11 |
| 5,135,168 A * | 8/1992 | Wang | .............................. | 239/70 |
| 5,715,866 A * | 2/1998 | Granger | ..................... | 137/624.11 |
| 5,826,619 A * | 10/1998 | Roman | ..................... | 137/624.11 |
| 6,337,635 B1 * | 1/2002 | Ericksen et al. | ........... | 340/12.28 |
| 6,719,010 B1 * | 4/2004 | Yi-Chang | ................ | 137/624.11 |
| 8,245,985 B2 * | 8/2012 | Goetz | ............................. | 248/75 |
| 2010/0163126 A1 * | 7/2010 | Leer et al. | ................ | 137/624.11 |

* cited by examiner

*Primary Examiner* — Kevin Murphy
*Assistant Examiner* — R. K. Arundale
(74) *Attorney, Agent, or Firm* — Bacon & Thomas, PLLC

(57) ABSTRACT

A water timer is revealed. The water timer includes a base assembly, a valve assembly and a display module. The base assembly consists of a first housing and a second housing. The valve assembly having a conducting tube and a valve member is for turning on or off water supply. The display module is composed of a first space, a circuit board, an input member, and a rectangular column connected to t first space and used for receiving a battery box. The water timer features on that the display module is arranged with an integrated rectangular column used for receiving a battery box and the display module is locked on the first housing.

15 Claims, 8 Drawing Sheets

WATER TIMER

BACKGROUND OF THE INVENTION

1. Field of the Invention

The present invention relates to a water timer with timed watering function for gardening and agricultural irrigation, especially to a water timer with improved housing and a display module for input of preset time/duration.

2. Description of Related Art

Irrigation is required for outdoor plants such as flowers, trees, lawn or bushes. Thus a water timer is an aid to allow water flowing for a preset time. One end of the water timer is an assembly part that couples to a soft hose while the other end thereof is a coupling part that is connected to and fixed on a water source. When the water source is on, a valve of the water timer is opened at a preset time so as to allow water to pass through the hose and flow to a preset sprinkler for irrigation.

Refer to U.S. Pat. No. 8,104,509 "Water timer system having removable input and display module", a water timer system is revealed. The water timer system includes a base assembly and an input and display module. When the input and display module is positioned in a first module position, (i) a first projection of the input and display module is received within a first aperture of a receptacle structure, and (ii) a second projection of the input and display module is received within a second aperture of the receptacle structure. When the input and display module is positioned in a second module position, (i) the first projection of said input and display module is spaced apart from the first aperture of the receptacle structure, and (ii) the second projection of the input and display module is spaced apart from the second aperture of the receptacle structure.

The above design mainly enables users to remove the display module from the base assembly conveniently. Thereby users can set the display module in an operating mode required at one place (such as indoors) and then position the display module on the base assembly of the water timer system. The design prevents the circuit of the display module from being damaged by moisture.

However, the first projection and the second projection of the display module are extended and projected from an inner surface at one end of the module. For convenient removal, the first projection and the second projection are able to be easily released from the first aperture and the second aperture respectively. Thus the main purpose of the above design is in that the display module can be removed easily and conveniently by users.

SUMMARY OF THE INVENTION

Therefore it is a primary object of the present invention to provide a water timer that is formed by multiple components and assembled conveniently for manufacturers. The components of the water timer are assembled and locked tightly, not easily falling off. A display module is easily positioned on and assembled with a base assembly tightly. It is another object of the present invention to provide a water timer in which the replacement of batteries is easy and a battery box is protected from being damaged by rains.

In order to achieve the above objects, a water timer of the present invention includes a base assembly, a valve assembly and a display module.

The base assembly is composed of a first housing, a second housing and two side plates. The first housing is formed by a frame, guiding slots, and first assembly holes. The top end and the bottom end of a periphery of the frame are respectively disposed with the first assembly concaves and the second assembly concaves. The edge of the frame is extended to form a first outer surface and a second outer surface. The first outer surface is the wall surface extended from and integrated with the second outer surface. The inner surfaces corresponding to the first outer surface and the second outer surface are a first inner surface and a second inner surface. The second outer surface is arranged with symmetrical mounting parts. The valve assembly is leaning against and fixed by the mounting parts. The first and the second inner surfaces are disposed with at least one guiding slot and the first assembly hole respectively. The guiding slots are divided into two sets arranged symmetrically on top side and bottom side respectively, allowing ribs on the side plates sliding to be positioned therein. The first assembly holes are corresponding to and assembled with second assembly holes of the second housing.

The valve assembly is formed by a conducting tube and a valve member. The conducting tube includes an inlet and an outlet while the valve member is disposed between the inlet and the outlet of the conducting tube.

The display module consists of a first space, a first cover, a second cover, a circuit board, an input member, and a battery box connected to the first space. The first space includes a first cover and a second cover. The front surface of the first cover is disposed with an assembly frame for mounting the input member, a transparent cover for viewing a display panel and walls surrounding the first cover so as to receive the circuit board and the display panel. First fasteners and second fasteners are disposed on the wall and assembled with the first assembly concaves and the second assembly concaves of the first housing correspondingly. The second cover is disposed with an assembly plate for sealing the first space of the first cover correspondingly. A rectangular column is extended from one end surface of the assembly plate. The rectangular column includes an open first end and an open second end. A rib is disposed on an inner wall of the first end while the second end is for mounting a battery box. One end of the battery box is an opening end while the other end thereof is a closed surface. The closed surface is extended toward the opening end to form surrounding walls. The box has a front end and a rear end. The rear end is disposed with a pushing part and a first power contact while the front end is arranged with a second power contact and an opening.

The display module is inclined and is assembled with the first housing at an angle below the horizontal while the rectangular column of the second cover is inclined downward relatively. In a lateral view of the first housing, the rectangular column is inclined and arranged at the angle of depression. The second housing includes an outer surface and an inner surface. A rectangular window is disposed on one end of the outer surface and is for the second end of the rectangular column to lean against. Second assembly holes corresponding to the first assembly holes of the first housing are disposed on the inner surface. A screw is threaded into each second assembly hole so as to connect the first housing with the second housing.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Please refer to following embodiments for details, features and effects of the present invention.

Figure 1:
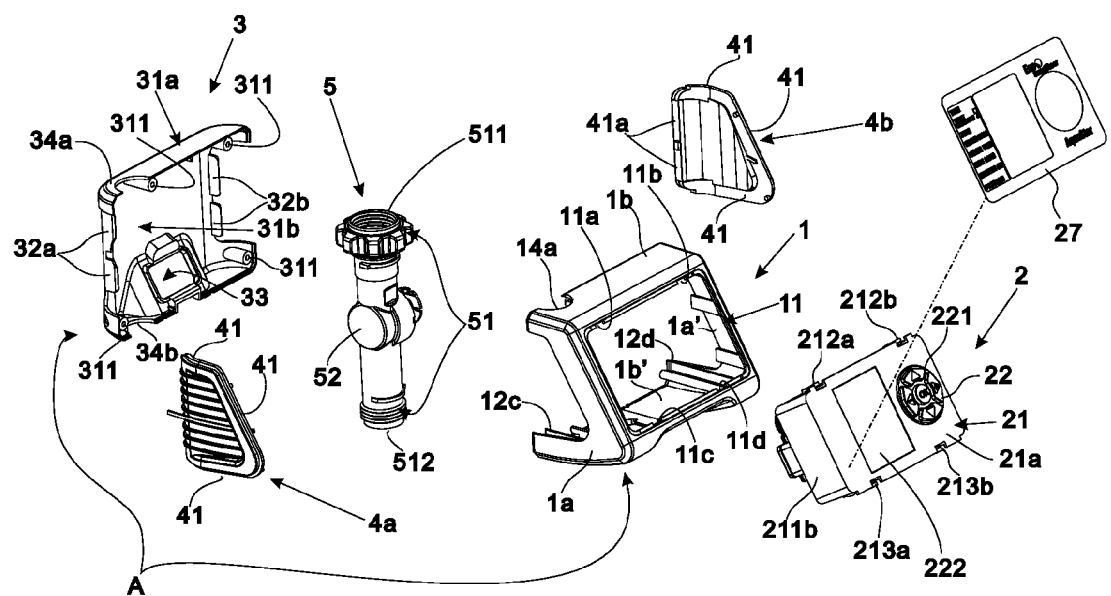
FIG. 1 is an explosive view of an embodiment according to the present invention.
Figure 2:
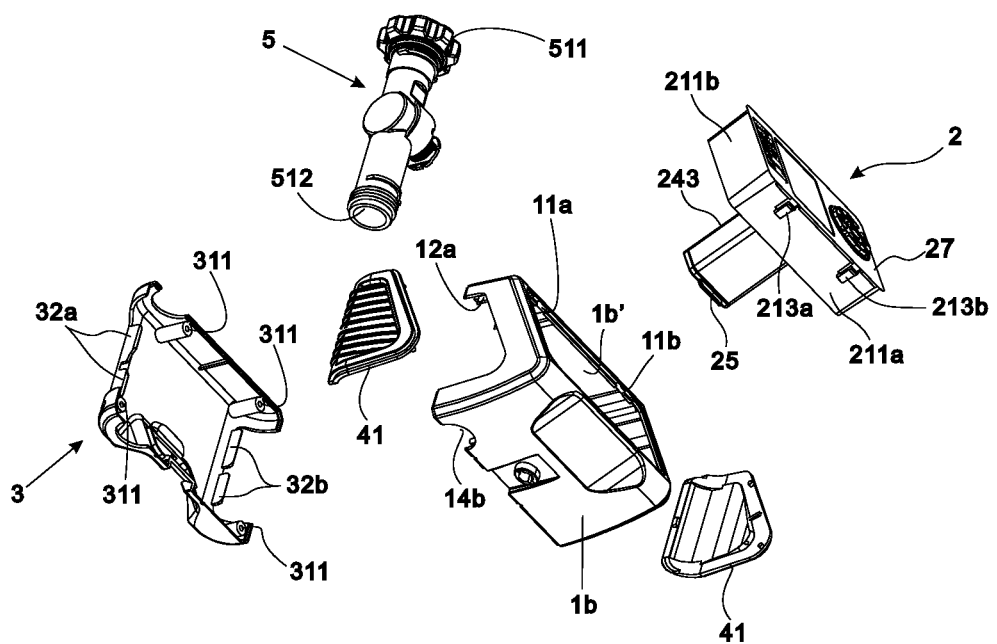
FIG. 2 is another explosive view of an embodiment according to the present invention.

Refer to FIG. 1, a water timer of the present invention includes a base assembly A, a display module 2, and a valve assembly 5. The connection relationship among the components of the present invention is shown from FIG. 3 to FIG. 7.

Figure 5:
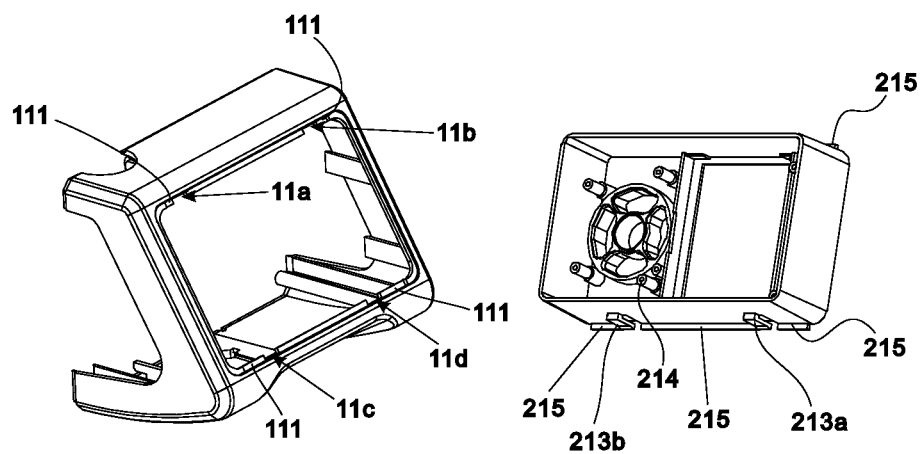
FIG. 5 is a schematic drawing showing a first cover and a first housing corresponding to each other of an embodiment according to the present invention.
Figure 6:
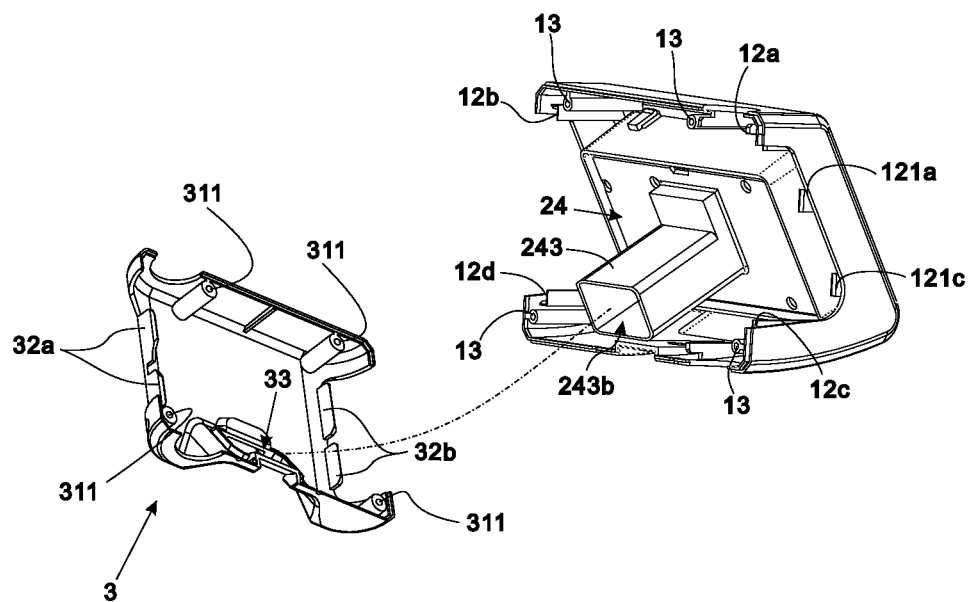
FIG. 6 is a schematic drawing showing an assembly of a first housing and a display module being corresponding to a second housing of an embodiment according to the present invention.

The base assembly A consists of a first housing 1, a second housing 3 and two side plates 4a, 4b. The first housing 1 is formed by a frame 11 and first assembly holes 13. As shown in FIG. 5, the frame 11 is disposed on a front side of the first housing 1 and is having a periphery 111 arranged at the edge thereof. The top end and the bottom end of the periphery 111 are respectively disposed with the first assembly concaves 11a, 11b and the second assembly concaves 11c, 11d. The edge of the frame 11 is extended to form a first outer surface 1a and a second outer surface 1b. The first outer surface 1a is the wall surface extended from and integrated with the left side and the right side of the frame 11 while the second outer surface 1b is the wall surface extended from and integrated with the top side and the bottom side of the frame 11. The inner surfaces corresponding to the first outer surface 1a and the second outer surface 1b are a first inner surface 1a' and a second inner surface 1b'. The second outer surface 1b is set with symmetrical mounting parts 14a,14b. The valve assembly 5 is leaning against and fixed by the mounting parts 14a,14b. The first inner surface 1a' is arranged with first guiding slots 12a, 12b, 12c, 12d and second guiding slots 121a, 121b, 121c, 121d. The first guiding slots 12a, 12b, 12c, 12d are divided into two sets arranged symmetrically on top side and bottom side respectively, allowing ribs 41 on the side plates 4a, 4b sliding to be positioned therein. The first inner surface 1a' and the second inner surface 1b' are respectively disposed with at least one first assembly hole 13. The first assembly holes 13 are corresponding to and assembled with second assembly holes 311 of the second housing 3.

The valve assembly 5 is set between the first housing 1 and the second housing 3, clipped and mounted therebetween. The valve assembly 5 is formed by a conducting tube 51 and a valve member 52. The conducting tube 51 includes an inlet 511 and an outlet 512 while the valve member 52 is disposed between the inlet 511 and the outlet 512 of the conducting tube 51.

The side plates 4a, 4b are respectively arranged with ribs 41 and at least one limit part 41a. The ribs 41 are set on edges of the side plates 4a, 4b while the limit part 41a is disposed on the edge of one end of the side plates 4a, 4b. The ribs 41 are around the side plates 4a, 4b and stopped beside the limit part 41a. The limit part 41a is used to receive and position stoppers 32a, 32b of the second housing 3.

Figure 3:
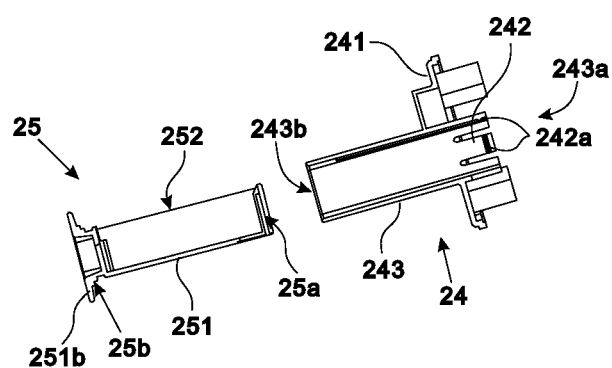
FIG. 3 is an explosive cross sectional view of a second cover and a battery box of an embodiment according to the present invention.
Figure 4:
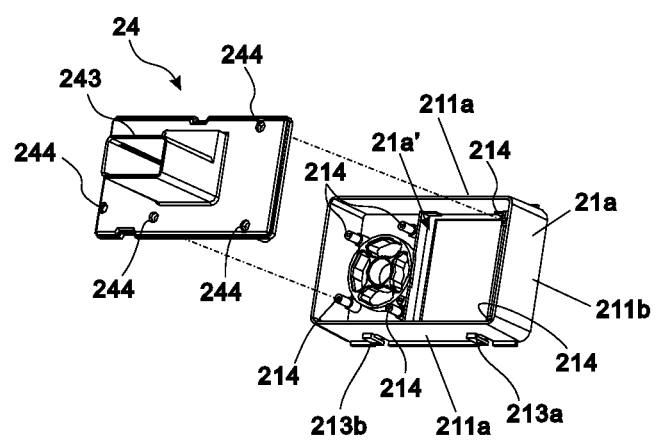
FIG. 4 is a schematic drawing showing a first cover and a corresponding second cover of an embodiment according to the present invention.

The display module 2 consists of a first cover 21, a second cover 24, a circuit board 26, an input member 22, and a battery box 25 connected to the second cover 24. The first cover 21 is composed of a panel 21a for showing operation instructions and walls 211a, 211b around the panel 21a. A label plate 27 is attached over the panel 21a. Thereby a first space 21a' for loading a circuit board 26 and a display panel is formed and is disposed with an assembly frame 221 for mounting the input member 22 and a transparent cover 222 for users to view the display panel. Moreover, an inner bottom surface of the first cover 21 is arranged with a plurality of third assembly holes 214 while a front end of the walls 211a, 211b is disposed with a stopping part 215, as shown in FIG. 4 and FIG. 5. Refer to FIG. 3, the second cover 24 is defined as a component for closing and sealing the first space 21a'. The wall 211a represents a top wall and a bottom wall integrated with and extended from the panel 21a while the wall 211b includes a left wall and a right wall integrated with and extended from the panel 21a. First fasteners 212a, 212b and second fasteners 213a, 213b disposed on the wall 211a are corresponding to and assembled with the first assembly concaves 11a, 11b and the second assembly concaves 11c, 11d of the first housing 1.

As shown in FIG. 3 and FIG. 4, the second cover 24 includes an assembly plate 241, an elastic piece 242, a rectangular column 243 and a plurality of fourth assembly holes 244. The assembly plate 241 is for sealing the first space 21a' after being assembled with the first cover 21 correspondingly. The rectangular column 243 is extended from one end surface of the assembly plate 241 and the fourth assembly holes 244 are arranged at the assembly plate 241. The rectangular column 243 includes an open first end 243a and a second end 243b. A rib 242a is disposed on an inner wall of the first end 243a while the second end 243b is for mounting a battery box. One end of the battery box 25 is an opening end 252 while the other end thereof is a closed surface 251. The closed surface 251 is extended toward the opening end 252 and is surrounded by wall surfaces so as to form the box. The box has a front end 25a and a rear end 25b. The rear end 25b is disposed with a pushing part 251a and a first power contact 251a while the front end 25a is arranged with a second power contact 253. The pushing art 251b is defined as a component for users to open the battery box 25 and replace the battery. The first power contact 251 and the second power contact 253 are defined as components in contact with the positive electrode and the negative electrode of the battery.

It should be noted that the display module 2 is inclined at an angle below the horizontal to be assembled with the first housing. Thus the rectangular column 243 of the second cover 24 is inclined downward relatively. In a lateral view of the first housing 1, the rectangular column 243 is inclined and arranged at the angle below the horizontal (the angle of depression). Moreover, the front end 25a of the battery box 25 is mounted into the second end 243b of the rectangular column 243 at an angle above the horizontal and is locked/positioned by the rib 242a of the first end 243a. A periphery of the first end 243a of the rectangular column 243 is set with at least one longitudinal groove so as to form at least one separated elastic piece 242. The rib 242a is arranged at one end of the elastic piece 242.

The second housing 3 includes an outer surface 31a and an inner surface 31b. A rectangular window 33 and mounting parts 34a, 34b are disposed on one end of the outer surface 31a. The second end 243b of the rectangular column 243 is leaning against and fixed by the rectangular window 33. The mounting parts 34a, 34b are corresponding to the mounting parts 14a,14b of the first housing 1 for clipping the valve assembly 5 therebetween. The shape of the mounting parts 34a, 34b and the mounting parts 14a,14b is not limited and is able to be modified according to the shape of the valve assembly 5. A plurality of second assembly holes 311 corresponding to the first assembly hole 13 of the first housing 1 is disposed on the inner surface 31b for being threaded a screw (not shown in figure) therein and assembling with the corresponding first housing 1 and the second housing 3 so as to form a second space B, as shown in FIG. 7.

The first fasteners 212a, 212b and the second fasteners 213a, 213b on the first cover 21 of the display module 2 are hidden by the label plate 27 attached over the panel 21a. That means the label plate 27 covers the first fasteners 212a, 212b and the second fasteners 213a, 213b. Thus after the display module 2 being assembled into the frame 11 of the first housing, the first fasteners 212a, 212b and the second fasteners 213a, 213b are not exposed and unable to be seen.

Figure 7:
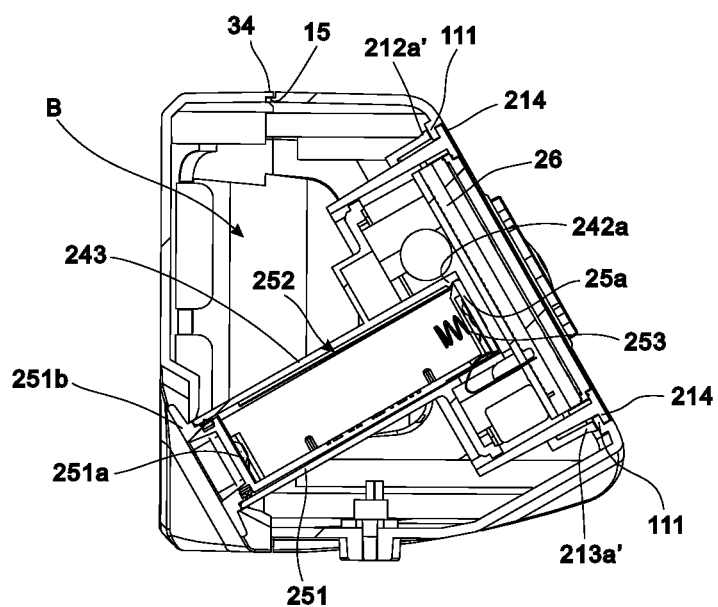
FIG. 7 is a cross sectional view of an embodiment according to the present invention.

Refer to FIG. 7, one end of the first fasteners 212a, 212b and of the second fasteners 213a, 213b is disposed with hooks 212a', 213a' respectively. The hooks 212a', 213a' feature on the inverted type. The hooks 212a', 213a' are disposed in opposite directions. The first fasteners 212a, 212b and the second fasteners 213a, 213b are arranged at the wall 211a of the first cover 21 symmetrically, without projecting out of the wall 211a. After being mounted into the frame 11 of the first housing 1, the display module 2 is locked with the first assembly concaves 11a, 11b and the second assembly concaves 11c, 11d of the frame 11 by the hooks 212a', 213a'.

The above components are assembled by the following steps:

(i) First the second cover 24 of the display module 2 is aligned to an inner edge of the walls 211a, 211b of the first cover 1, as shown in FIG. 4 and a screw is passed through each fourth assembly holes 244 and threaded into the third assembly hole 214 so as to connect the first cover 21 and the second cover 24 closely. This is the first step. Before connecting the first cover 21 and the second cover 24, the display panel, the input member 22, and the circuit board 26 are mounted into the first cover 21.

(ii) Then the first fasteners 212a, 212b and the second fasteners 213a, 213b of the display module 2 are corresponding to and locked with the inner walls of the first assembly concaves 11a, 11b and the second assembly concaves 11c, 11d of the first housing 1 at the angle below the horizontal. The stopping part 215 of the first cover 21 is against the periphery 111 of the first housing 1. Thereby the display module 2 is connected to the first housing 1 and the display module 2 is unable to be detached from the outside. This is a second step.

(iii) Next, the valve assembly 5 is positioned at the mounting parts 14a,14b of the first housing 1 and the ribs 41 of the side plates 4a, 4b are inserted the first guiding slots 12a, 12b, 12c, 12d and the second guiding slots 121a, 121b, 121c, 121d of the first housing 1 for positioning. This is the third step.

Figure 8:
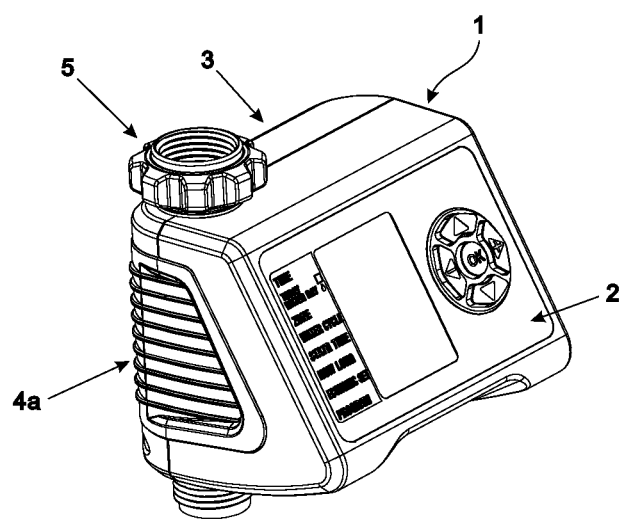
FIG. 8 is a perspective view of an embodiment according to the present invention.

(iv) The mounting parts 34a,34b of the second housing 3 is aligned to the valve assembly 5 and the second assembly holes 311 are corresponding to the first assembly holes 13 of the first housing 1. Then screws are threaded into the second assembly holes 311 and the first assembly holes 13 so as to connect the first housing 1 to the second housing 3. At last, the front end 25a of the battery box 25 is mounted into the second end 243b at the angle above the horizontal. Thus the assembling of the water timer of the present invention is completed. The assembled water timer is shown in FIG. 8.

Furthermore, the periphery of the first housing 1 and the periphery of the second housing 3 are disposed with at least one male buckle and at least one female buckle. The male buckle is a rib 15 projecting from the periphery while the female buckle is a hollow part 34 corresponding to the rib 15. Thereby the first housing 1 and the second housing 3 are assembled with and positioned by each other.

In summary, the present invention has following advantages:

1. Due to the locked/limited design, the assembling of the water timer is easy and quick during production processes.

2. The battery box 25 is mounted in the rectangular column 243 at the angle below the horizontal. The inclined arrangement of the battery box 25 enables smooth movement of the rectangular column 243 while replacing the battery. Moreover, when there is water flowing into the water timer, the water flows downward along the rectangular column 243. Such design prevents water from flowing into the battery box 25.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A water timer comprising:
a base assembly having a first housing and a second housing corresponding to and assembled with each other; the first housing is disposed with a frame while the frame is arranged with at least one first assembly concave and at least one second assembly concave;
a valve assembly having a conducting tube and a valve member;
a display module that includes a first space, a first cover, a second cover, a rectangular column connected to the second cover, and walls surrounding the first cover; the first cover assembled with the second cover to form the first space; at least one first fastener and at least one second fastener are disposed on an outer edge of the walls while the first fastener and the second fastener are assembled with the first assembly concave and the second assembly concave of the first housing correspondingly; the second cover is arranged with an assembly plate for covering a receiving space of the first cover; the rectangular column is extended from one end surface of the assembly plate and a battery box is mounted into the rectangular column;
wherein the first fastener and the second fastener of the display module are connected to and locked with the first assembly concave and the second assembly concave of the first housing, after the first fastener and the second fastener being assembled with the first assembly concave and the second assembly concave of the first housing correspondingly the display module is unable to be separated from the first housing from the an exterior of the base assembly.

2. The device as claimed in claim 1, wherein the first housing is disposed with at least one first assembly hole while the second housing is arranged with at least one second assembly hole; the first assembly hole is corresponding to and assembled with the second assembly hole.

3. The device as claimed in claim 1, wherein the second housing is disposed with a rectangular window; an outer end of the rectangular column is leaning against and positioned by the rectangular window.

4. The device as claimed in claim 1, wherein a front surface of the first cover is arranged with an assembly frame for mounting an input member and a transparent cover for viewing a display panel.

5. The device as claimed in claim 1, wherein the first space is a space for receiving a circuit board and a display panel.

6. The device as claimed in claim 1, wherein one end of the battery box is an opening end while the other end thereof is a closed surface; the closed surface is extended toward the opening end to form surrounding walls; the battery box has a front end and a rear end; the rear end is disposed with a pushing part and a first power contact while the front end is arranged with a second power contact and an opening.

7. The device as claimed in claim 1, wherein a front end of the battery box is locked and positioned by at least one rib of the rectangular column.

8. The device as claimed in claim 1, wherein the conducting tube includes an inlet and an outlet.

9. The device as claimed in claim 8, wherein the valve member is disposed between the inlet and the outlet of the conducting tube.

10. The device as claimed in claim 1, wherein a circuit board is mounted in the first space and is connected to an input member.

11. A water timer comprising:
a base assembly having a first housing and a second housing while a front side of the first housing is disposed with a frame; a periphery is arranged around the frame while a top end and a bottom end of the periphery are respectively disposed with at least one first assembly concave and at least one second assembly concave; an edge of the frame is extended to form a first outer surface and a second outer surface; the first outer surface is extended to two side walls and integratedly connected to the second surface while inner surfaces corresponding to the first outer surface and the second outer surface are a first inner surface and a second inner surface; the first inner surface and the second inner surface are respectively disposed with at least one first assembly hole; the first assembly hole is corresponding to and assembled with at least one second assembly holes of the second housing;

a valve assembly having a conducting tube and a valve member;
a display module that includes a first space, a first cover, a second cover, a rectangular column connected to the second cover, and walls surrounding the first cover; the first cover assembled with the second cover to form the first space; at least one first fastener and at least one second fastener are disposed on an outer edge of the walls while the first fastener and the second fastener are assembled with the first assembly concave and the second assembly concave of the first housing correspondingly; the second cover is arranged with an assembly plate for covering a receiving space of the first cover; the rectangular column is extended from one end surface of the assembly plate and having an open first end and an open second end; at least one rib is disposed on an inner wall of the first end while the second end is mounting with a battery box; the battery box is able to be positioned in the rectangular column and is also able to be removed from the rectangular column;
wherein the first fastener and the second fastener of the display module are connected to and locked with the first assembly concave and the second assembly concave of the first housing, after the first fastener and the second fastener being assembled with the first assembly concave and the second assembly concave of the first housing correspondingly the display module is unable to be separated from the first housing from the an exterior of the base assembly.

12. The device as claimed in claim 11, wherein one end of the first fastener and one end of the second fastener are disposed with a hook; the hook of the first fastener and the hook of the second fastener are disposed in opposite directions.

13. The device as claimed in claim 12, wherein the hooks are locked with inner walls of the first assembly concave and the second assembly concave of the first housing.

14. The device as claimed in claim 11, wherein a front end of the surrounding walls are disposed with a stopping part.

15. The device as claimed in claim 11, wherein the second outer surface is disposed with symmetrical mounting parts; the valve assembly is leaning against and fixed by the mounting parts.

* * * * *